(12) United States Patent
Dong (10) Patent No.: US 7,044,506 B2
(45) Date of Patent: May 16, 2006

(54) QUICK CONNECTOR ASSEMBLY (75) Inventor: Zhao Wei Dong, Xinglin (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 111 days.

(21) Appl. No.: 10/635,966

(22) Filed: Aug. 7, 2003

(65) Prior Publication Data

US 2005/0029810 A1 Feb. 10, 2005

(51) Int. Cl.
*F16L 39/00* (2006.01)

(52) U.S. Cl. .................... 285/319; 285/921; 285/81

(58) Field of Classification Search ............. 285/272, 285/278, 280, 82, 148.1, 148.5, 148.19, 148.21, 285/87, 313, 317, 308, 319, 921, 39, 233, 285/320, 148.14, 81
See application file for complete search history.

(56) References Cited

U.S. PATENT DOCUMENTS 5,324,081 A * 6/1994 Umezawa ................... 285/319
5,415,825 A * 5/1995 Sellers ....................... 285/319
5,725,257 A * 3/1998 Sakane et al. ................ 285/81

* cited by examiner

Primary Examiner—Aaron Dunwoody
(74) Attorney, Agent, or Firm—Wallenstein Wagner & Rockey, Ltd.

(57) ABSTRACT

A connector assembly (10) for releasably connecting a pair of conduits (12, 14) is disclosed. The assembly (10) comprises a first member (20) and a second member (40). The first member (20) has a nozzle (22) and the first member (20) is adapted to be connected to one of the conduits (12). The first member (20) includes an anchor (60) rotatably mounted on the first member (20). The anchor (60) has at least one resilient tab (62) extending therefrom. The second member (40) has an opening (45) that receives the nozzle (22). The second member (40) has at least one aperture (46). The second member (40) is also adapted to be connected to the other of the conduits (14). The tab (62) engages the aperture (46) to releasably connect the first and second members (20, 40).

24 Claims, 2 Drawing Sheets

QUICK CONNECTOR ASSEMBLY

TECHNICAL FIELD

The present invention relates to connector assemblies. More specifically, the present invention relates to a connector assembly for quickly connecting and disconnecting conduits.

BACKGROUND OF THE INVENTION

Conduits for conveying a large variety of substances are well known. Such conduits can include pipes and tubing for conveying liquids such as water, or gases such as oxygen. Other conduits, such as chutes, are most suitable for conveying solid materials. Traditionally conduits come in two forms: rigid or flexible. Rigid conduits include gas and water pipes, chutes, and ducts. Flexible conduits include tubing and hoses. All such conduits serve the purpose of conveying substances by flow of the substance through the interior of the conduit.

Traditionally, conduits have been connected with a large variety of connectors. Many varieties of pipe fittings, tubing connectors, nozzles, and clamps are well known in the art. One disadvantage of traditional connectors is the significant amount of time required to perform the connection. Pipe fittings, for example, require the tightening and loosening of nuts, washers, valves, and rings for connection and disconnection. Tubing connectors often involve forcibly inserting fittings and tightening and loosening of clamps. Thus, a need exists for a connector assembly which allows for the rapid connection and disconnection of conduits. Another disadvantage of traditional connectors is the lack of interchangeability of such connectors. Traditional connectors are sized to work only with particular dimensions and configurations of conduits, requiring a large variety of connectors to be manufactured. This needlessly increases inventory, costs of manufacture, and waste materials. Furthermore, traditional connectors have provided poor results in connecting conduits of differing materials, such as rigid pipe and flexible tubing. Thus, a need exists for a connector assembly that provides interchangeability between connection of various conduits.

The connector assembly of the present invention is provided to solve these and other problems.

SUMMARY OF THE INVENTION

The invention is a connector assembly for releasably connecting a pair of conduits. The assembly comprises a first member and a second member. The first member has a nozzle and the first member is adapted to be connected to one of the conduits. The first member includes an anchor rotatably mounted on the first member. The anchor has at least one resilient tab extending from the first member. The second member has an opening that receives the nozzle. The second member has at least one aperture. The second member is also adapted to be connected to the other of the conduits. The tab engages the aperture to releasably connect the first and second members.

BRIEF DESCRIPTION OF THE DRAWINGS

The present invention will now be described with reference to the accompanying drawings, in which.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Various forms of conduits are well known in the art. Generally, all conduits are devices for internally conveying a substance. Conduits generally are either rigid, such as pipes, or flexible, such as tubing. Conduits can be either closed, or partially open, so long as they are configured to internally convey a substance. Although not required, many conduits terminate in fittings such that various conduits can be connected together. Virtually all forms of substances can be conveyed in a conduit, including solids, liquids, and gases.

Figures 1, 2, 3:
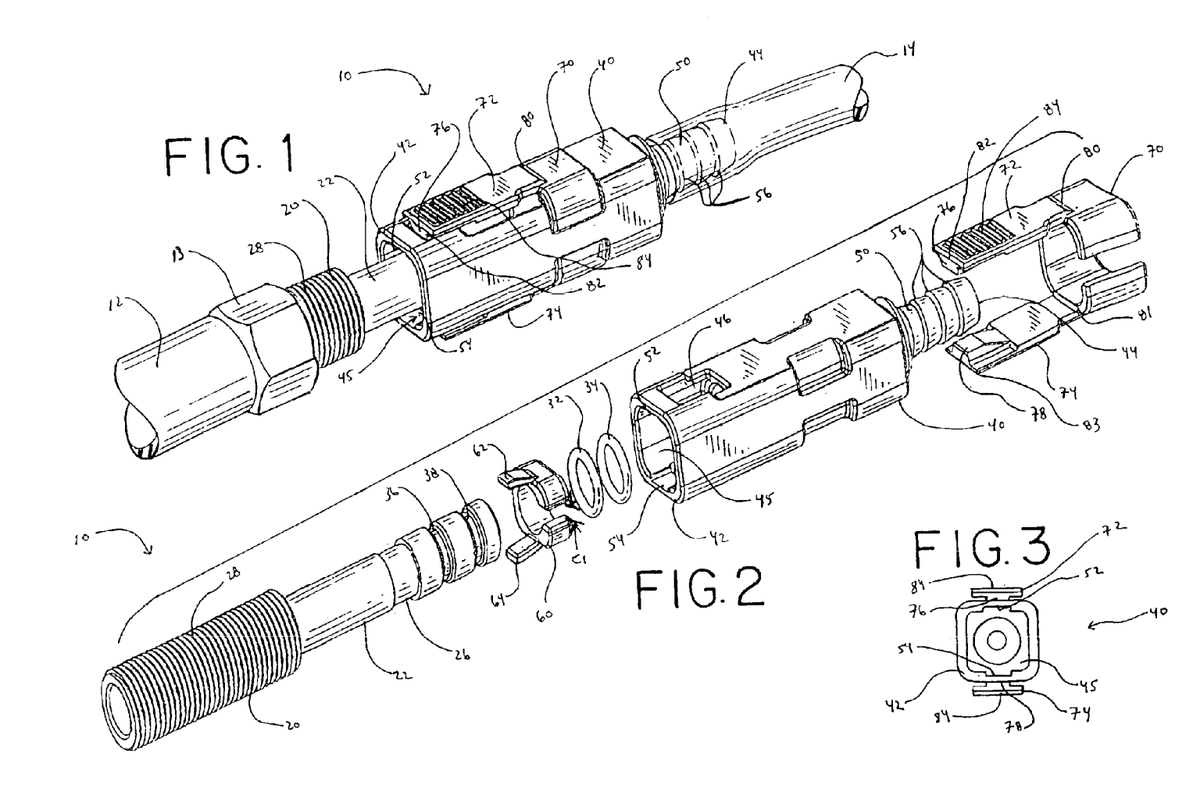
FIG. 1 shows a perspective view of the improved connector assembly of the present invention connecting a pair of conduits.
FIG. 2 shows an exploded view of the connector assembly of FIG. 1.
FIG. 3 shows an end view of the second member of the connector assembly of FIG. 1.

As seen in FIG. 1, the present invention relates to an improved connector assembly 10 for releasably connecting a pair of conduits, a first conduit 12 and a second conduit 14. The connector assembly 10 generally comprises a first member 20 having a nozzle 22. One end 24 of the first member 20 is adapted to be connected to the first conduit 12. The first conduit 12 may include a fitting such as a nut 13.

The connector assembly 10 also includes a second member 40 adapted to be connected to the second conduit 14. In particular, a second distal end 44 of the second member 40 is adapted to be connected to the second conduit 14.

Preferably, the first member 20 and the second member 40 are made of brass and a plastic material, respectively. The first member 20 and the second member 40 are releasably connected to one another to form the connection assembly 10. To facilitate the connection of the first member 20 to the second member 40, the first distal end 42 of the second member 40 includes an opening 45. Particularly, the nozzle 22 of the first member 20 projects through this opening 45 and into the interior portion of the second member 40.

Referring to FIG. 2, the first member 20 and the second member 40 have cooperative structure releasably connecting them together. More particularly, the second member 40 releasably receives an anchor 60 secured to the first member 20. Specifically, the anchor 60 is positioned within a groove 26 formed on an outer surface of the first member 20. The anchor 60 is rotatable about that groove 26. The placement of the anchor 60 within this groove 26 also fixes the longitudinal movement of the anchor 60, i.e., this placement prevents the anchor 60 from moving upwardly or downwardly along the axis of the first member 20. While the groove 26 extends around the entire outer peripheral surface of the first member 20, it should be understood that the groove 26 could extend around only a portion of the peripheral surface. The anchor 60 has a generally curvilinear configuration cooperatively dimensioned with the groove 26 of the nozzle 22. Preferably, the anchor 60 has a "C-shaped" configuration as seen in FIG. 2. The anchor 60 includes a clearance C1 to facilitate installation of the anchor 60 onto the groove 26 of the nozzle 22, as seen in FIG. 2.

The anchor 60 includes at least one tab, and in this embodiment includes a pair of resilient tabs 62, 64. The tabs 62, 64 extend generally outwardly from the anchor 60. These first and second tabs 62, 64 are typically made of the same flexible plastic material as the anchor 60. The tabs 62, 64 facilitate engagement of the first member 20 with the second member 40. The second member 40 includes at least one aperture, however, in this preferred embodiment, the second member 40 has two apertures 46, 48. In this preferred embodiment, the first tab 62 is snap fitted into and releasably engages aperture 46 in the second member 40, while the second tab 64 is snap fitted into and releasably engages aperture 48.

It shall be understood by those of skill in the art that the apertures 46, 48 and tabs 62, 64 can be reversed, such that at least one of the tabs 62, 64 could be provided in the second member 40, while at least one of the complementary apertures 46, 48 could be fabricated into the anchor 60.

As may best be seen in FIG. 2, the second member 40 includes an integral collar 70. In this embodiment, integral collar 70 overlies and is removably secured to this second member 40. Those of skill in the art will understand that in another embodiment, this integral collar 70 can fixedly secured to the second member 40. In either event, either the integral collar 70 or the lower end of the second member 40 can include at least one flexible wing.

In this preferred embodiment, the integral collar 70 includes two flexible wings 72 and 74. These flexible wings 72, 74 each have a fixed end 80, 81 that secures the wings to the second member 40, and a free end 82, 83. Adjacent their free ends 82, 83, the flexible wings 72, 74 include flats 76, 78, respectively. These free ends 82, 83 and their flats 76, 78 are positioned proximate to or adjacent apertures 46, 48, respectively, of the second member 40. Because of this positioning, the flexible wings 72, 74 and their flats 76, 78 are movable into the apertures 46, 48. By this movement inward movement towards the apertures 46, 48, the flats 76, 78 contact the tabs 62, 64, and cause corresponding inward movement of the tabs 62, 64 away from the apertures 46, 48. This in turn permits the disengagement of the first member 20 from the second member 40.

The following is a description of the interrelationship of the cooperative structures which releasably connect the first member 20 and the second member 40. As may be seen in FIG. 4, when the first member 20 is connected to the second member, the tabs 62, 64 engage the apertures 46, 48, respectively. When engaging the apertures, these tabs 62, 64 are in a so-called expanded position. To disengage the first member 20 and the second member 40, the tabs 62, 64 are put into a compressed position, depicted in FIG. 5. The tabs 62, 64 are put into this compressed position when the flats 76, 78 of the wings 72, 74 are moved into the apertures 46, 48. In this way, the flats 76, 78 contact the tabs 62, 64 to move the tabs 62, 64 from the expanded position to the compressed position.

Figures 4, 5, 6:
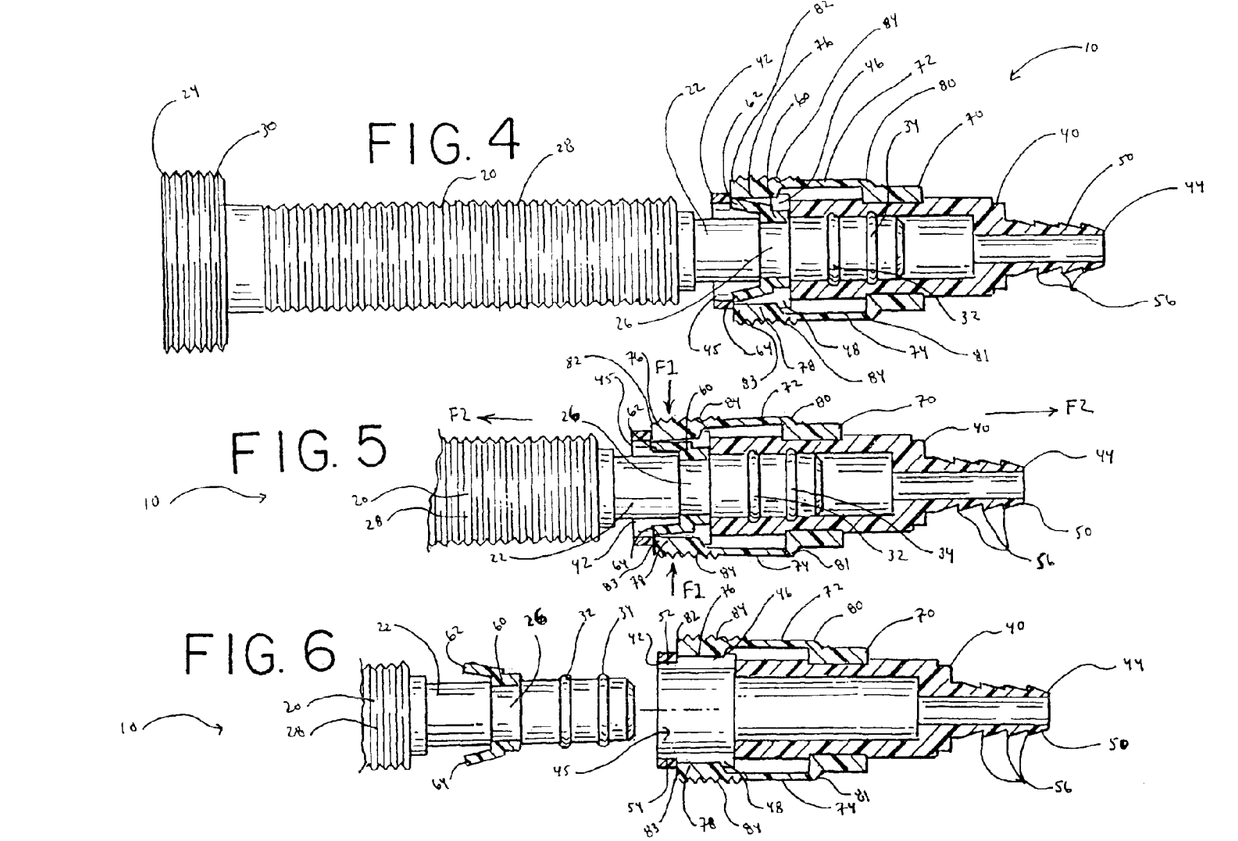
FIG. 4 shows a cross-sectional view of the connector assembly of FIG. 1, with the tabs of the anchor in the expanded position.
FIG. 5 shows a cross-sectional view of the connector assembly of FIG. 1, with the tabs of the anchor in the compressed position.
FIG. 6 shows a cross-sectional view of the connector assembly of FIG. 1, in the disconnected position.
Figure 4:
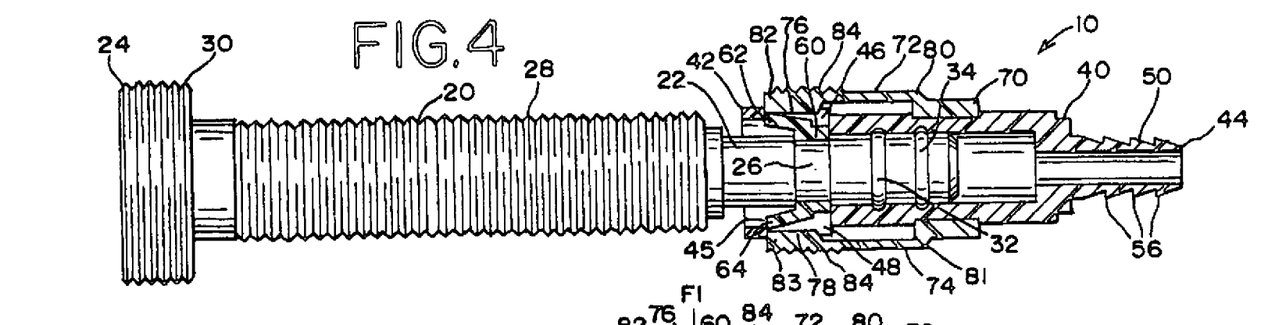
Figures 5, 6:
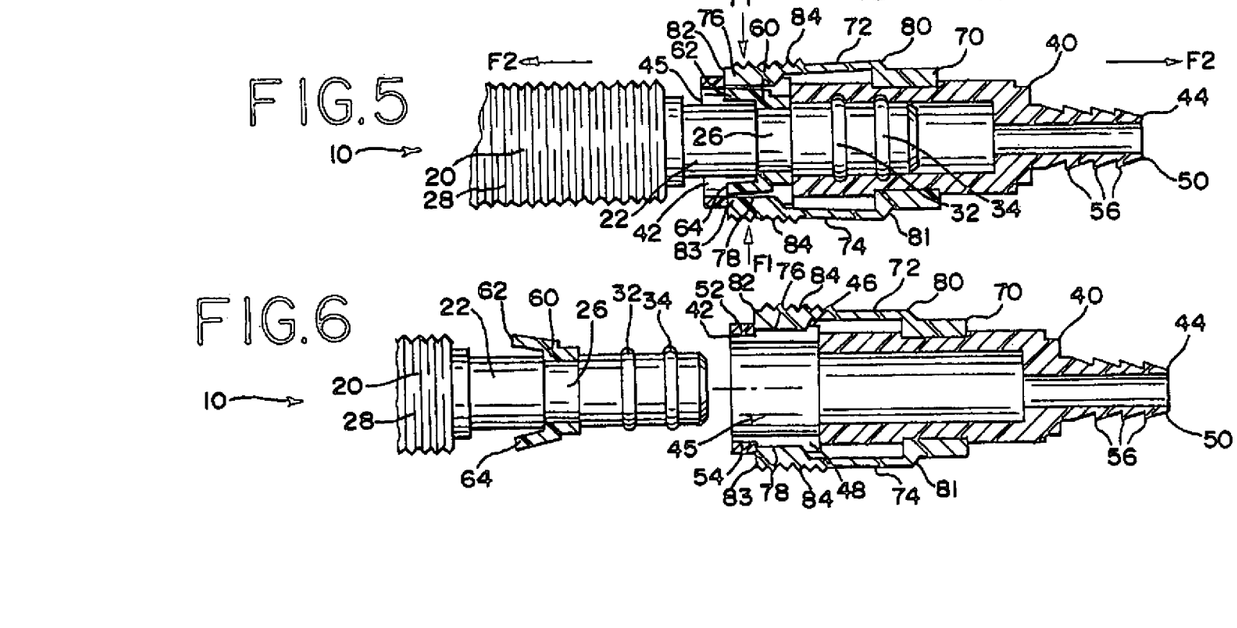

In this compressed position, shown in FIG. 5, the tabs 62, 64 move inwardly towards central longitudinal axis of the connector assembly 10. As a result, the tabs 62, 64 become disengaged from the apertures 46, 48, permitting the pulling apart of, and disconnection of, the first member 20 from the second member 40.

While this embodiment provides for two tabs 62, 64, two apertures 46, 48, and two wings 72, 74, a lesser or greater number of tabs, apertures, and wings may be provided in other embodiments.

Referring now to FIG. 4, one end 24 of the first member 20 is threaded, and in this embodiment includes a first threaded portion 28 and a second threaded portion 30. The second threaded portion 30 is adapted to be connected to the first conduit 12. The first threaded portion 28 is adapted to receive an optional fitting such as a nut 13 to further secure the first member 20 to the first conduit 12. The pitch of these threaded portions 28 and 30 may be the same or different.

The second member 40 also includes a second nozzle 50. As may best be seen in FIGS. 1 and 2, this second nozzle 50 is adapted to be inserted into the other conduit, i.e., the second conduit 14. Ribs 56 on the outside of the second nozzle 50 provide a more secure attachment of the nozzle 50 to the second conduit 14. A common hose clamp (not shown) provides still further means for more secure attachment of the second conduit 14 to the second nozzle 50.

In this embodiment, the first member 20 is inserted into the second member 40 in a specified way. To facilitate a proper connection, the second member 40 includes at least one longitudinal slot, and in this embodiment two slots 52, 54. As may be seen in FIG. 2, the tabs 62, 64 of the anchor 60 are diametrically opposed. The shape and size of these tabs 62, 64 are complementary to the shape and the size of the slots 52, 54, shown in FIG. 3. As a result, the first member 20 can only be slidably connected to the second member 40 if the tabs 62, 64 are aligned with the slots 52, 54, respectively, as seen in FIGS. 1 and 2. In addition, the relationship of the tabs 62, 64 and their corresponding slots 52, 54 ensures that (a) the anchor 60 and the first member 20 can only be inserted into the second member 40 when the tabs 62, 64 are aligned with the slots 52, 54, respectively; and (b) upon rotation of the first member 20 relative to the second member 40 to which it is connected, the tabs 62, 64, apertures 46, 48, and flats 76, 78 will remain aligned, ensuring that the wings 72, 74 will always be in the proper position to engage tabs 62, 64.

As noted above, the first member 20 of the connector assembly 10 includes a first nozzle 22. This nozzle may have at least one seal positioned within the second member 40, when the first member 20 is connected to the second member 40. In this embodiment, the connector assembly 10 includes a pair of O-ring type seals 32, 34 made of a resilient material, such as rubber, plastic, or another similar material. These seals 32, 34 are retained within second and third grooves 36, 38, respectively. When the first member 20 and second member 40 are connected, these seals 32, 34 abut against the inner surface of the second connector 40. This prevents leakage of fluids passing from the first conduit 12 through first 20 and second members 40 and into second conduit 14.

During disconnection of the connector assembly 10, the procedure required is the reverse of the connection procedure. Generally, to disconnect the connector assembly 10, the tabs 62, 64 must be moved to their inward, compressed position so that the tabs 62, 64 become disengaged from the apertures 46, 48. When this occurs, the first member 20 can be disengaged from the second member 40.

As seen in FIGS. 4–6, the flexible wings 72, 74 facilitate the disconnection of the first member 20 from the second member 40. The wings 72, 74 are squeezed inwardly by applying compression forces F1, typically with the fingers of the user, on the serrated grips 84 of the wings 72, 74, as seen in FIG. 5. The compression forces cause the wings 72, 74 to flex such that the free ends 82, 83 of the wings 72, 74 are moved towards one another. This causes the flats 76, 78 of each wing 72, 74 to enter the respective apertures 46, 48 of the second member 40. The flats 76, 78 pass through the apertures 46, 48 until they come into contact with the tabs 62, 64 of the anchor 60, as seen in FIG. 4. Continued application of the compression force F1 on the wings 72, 74 causes the flats 76, 78 to compress the tabs 62, 64 into their compressed position, as seen in FIG. 5. When the tabs 62, 64 attain their compressed position, the tabs 62, 64 disengage from the apertures 46, 48 such that the first member 20 may be disconnected from the second member 40.

Referring to FIG. 5, a second force F2 must be applied on the first and second member 20, 40 to disconnect them from one another while the tabs 62, 64 are maintained in the compressed position by the wings 72, 74. Once the first member 20 and second member 40 are separated sufficient for the tabs 62, 64 to have been withdrawn from the apertures 46, 48, the compression force F1 on the wings 72, 74 may be released. As the tabs 62, 64 and the anchor 60 are withdrawn from the second member 40, the resilient tabs 62, 64 spring or snap back to their expanded position, as shown in FIG. 6. Contemporaneously, the seals 32, 34 and the first nozzle 22 are removed from contact with the inner surface of the second member 40. As a result, the first member 20 and second member 40 of the connector assembly 10 are completely disengaged or disconnected.

Preferably, the first member 20 is of a one-piece construction, made of metal, such as brass, bronze, copper, or iron. The second member 40 is preferably made of plastic. The anchor 60 secured to the first member 20 is also preferably made of plastic. However other suitable materials may be used as well, so long as the tabs 62, 64 of the anchor 60 resiliently engage and disengage the apertures 46, 48 of the second member 40 to retain the first member 20 in connection with the second member 40.

The preferred embodiment of the connector assembly 10 of the present invention is described herein, and shown in the FIGURES. However, a variety of variations to the preferred embodiment are possible without departing from the spirit of the invention. For example, although in the preferred embodiment, the anchor 60 has two tabs 62, 64 which mate with two apertures 46, 48 on the second member 40, a different number of tabs and apertures may be used. Furthermore, the tabs 62, 64 can have a variety of different configurations. For example, the tabs 62, 64 can be compressible spring buttons, which are well known in the art. All that is necessary is that the tabs have an expanded position in which they engage the apertures 46, 48, and a compressed position in which the tabs 62, 64 are free of the apertures 46, 48 such that the first member 20 can be readily disconnected from the second member 40. Furthermore, the mating structures of the first member 20 and second member 40 can be reversed such that the second member 40 includes tabs 62, 64, and the first member 20 includes apertures 46, 48 which releasably engage with the tabs 62, 64. Additionally, the wings 72, 74 of the second member 40 are not required at all. The tabs 62, 64 can be manually compressed so that they disengage the apertures 46, 48, without the use of wings 72, 74. The wings 72, 74 are provided in the preferred embodiment to assist in more easily accessing and compressing the tabs 62, 64.

The connector assembly 10, and its "quick connector" properties, offer a number of benefits and advantages over traditional conduit connectors. The most significant advantage of the connector assembly 10 of this invention is the speed and convenience with which the conduits 12, 14 can be connected. Traditionally, the first conduit 12 would be connected to the second conduit 14 with the use of a fitting such as threaded couplers, or nozzles and clamps. Each of these traditional methods of connecting conduits requires significant time for insertion, coupling, and connection of the various components. With the present connector assembly 10, mere seconds are necessary in order to insert the first nozzle 22 of the first member 20 into the second member 40, so that the tabs 62, 64 engage the apertures 46, 48. Similarly, the separation of the first member 20 from the second member 40 can be done as quickly, requiring only the compression of the wings 72, 74 to disengage the tabs 62, 64 from the apertures 46, 48. Thus, the connector assembly 10 of this invention provides a "quick connector" with significant advantages over prior art methods or constructions.

Another significant advantage of the connector assembly 10 of this invention is the interchangeability and ability to connect the conduits 12, 14. After a conduit 12, 14 has been connected with either a first member 20 or second member 40, it may be connected to a large variety of other conduits, if those other conduits are also secured to either a first 20 or second member 40. Traditionally, conduits have a large variety of sizes and types of fittings. By connecting a first or second member 20, 40 to each fitting, the conduits may be easily connected to other conduits that also bear a first or second member 20, 40, regardless of the size or variety of fitting on the conduit. Thus, the connector assembly 10 provides a way to interchangeably connect a large variety of conduits by using a standard "quick connector."

Yet another advantage of the connector assembly 10 of the present invention is that it provides a device to connect different varieties of conduits. Traditionally, differing conduits have been difficult to connect using a single device. However, using only the connector assembly 10 of the present invention, conduit such as rigid pipe can be easily connected to other conduits, such as flexible tubing.

While the specific embodiments and various details thereof have been illustrated and described, numerous modification come to mind without significantly departing from the spirit of the invention, and the scope of protection is only limited by the following claims.

I claim:

1. A connector assembly for releasably connecting a pair of conduits, the assembly comprising:

a first member having a nozzle, the first member adapted to be connected to one of the conduits;

an anchor, having at least one tab extending therefrom, and rotatably mounted on the first member; and a second member receiving the nozzle, and the second member adapted to be connected to the other of the conduits, the second member further having at least one aperture, wherein the tab releasably engages the aperture, and wherein the second member has at least one flexible wing, wherein a portion of the wing is movable towards the aperture to contact the tab, wherein the anchor and second member have cooperative structure releasably connecting the first and second members.

2. A connector assembly for releasably connecting a pair of conduits, the assembly comprising:

a first member having a nozzle, the first member adapted to be connected to one of the conduits;

an anchor rotatably mounted on the first member, the anchor having at least one resilient tab extending therefrom;

a second member receiving the nozzle, wherein the second member has at least one aperture, the second member adapted to be connected to the other of the conduits;

wherein the tab engages the aperture to releasably connect the first and second members;

and at least one flexible wing, wherein a portion of the wing is movable towards the aperture to engage the tab.

3. The assembly of claim 2 wherein the wing has a fixed end and a free end, wherein the fixed end is connected to the second member, and wherein the free end is positioned proximate to the aperture.

4. The assembly of claim 3 wherein the second member further has a collar, wherein the fixed end of the wing is connected to the collar.

5. The assembly of claim 4, wherein the collar is removably connected to the second member.

6. The assembly of claim 2, wherein the second member includes a second nozzle adapted to be inserted into the second conduit.

7. The assembly of claim 3, wherein the second member has at least one slot.

8. The assembly of claim 7, wherein the anchor can be inserted into the second member only when the projection is aligned with the slot.

9. The assembly of claim 8 comprising two projections and two slots.

10. The assembly of claim 3, wherein the second member acts as a collar, wherein the fixed end of the wing is connected to the collar.

11. A connector assembly for releasably connecting a pair of conduits, the assembly comprising:

a first member having a nozzle, the nozzle having a groove, the first member adapted to be connected to one of the conduits;

an anchor rotatably mounted in the groove, the anchor having at least one resilient tab extending therefrom;

a second member having an opening that receives the nozzle in the first member, the second member further having at least one aperture, the second member adapted to be connected to the other of the conduits;

further comprising at least one flexible wing extending from the second member, wherein at least a portion of the wing is in communication with the aperture;

wherein the tab is moveable between an expanded position wherein a portion of the tab engages the aperture to connect the first and second members, and a compressed position wherein the tab is disengaged from the aperture permitting disconnection of the first and second members.

12. The assembly of claim 11, wherein the nozzle of the first member has at least one seal that, when the first and second members are connected, is positioned along the second member.

13. The assembly of claim 12, wherein the seal is an O-ring.

14. The assembly of claim 11, wherein the aperture is located in communication with the opening.

15. The assembly of claim 11, wherein the second member has at least one slot.

16. The assembly of claim 15, wherein the slot extends between the opening and the aperture.

17. The assembly of claim 15, wherein the slot is cooperatively dimensioned with the tab.

18. The assembly of claim 15, wherein the anchor can be inserted into the second member only when the tab is aligned with the slot.

19. The assembly of claim 18 comprising two tabs and two slots.

20. The assembly of claim 11, wherein a portion of the wing is movable into the aperture to contact the tab to move the tab from the expanded position to the compressed position.

21. The assembly of claim 11, wherein the wing has a fixed end and a free end, wherein the fixed end is connected to the second member, wherein the free end is proximate the aperture.

22. The assembly of claim 14, wherein at least one of the first or second member is made of plastic.

23. The assembly of claim 14, wherein a portion of the first member is threaded, wherein the threaded portion is adapted to be connected to one of the conduits.

24. The assembly of claim 14, wherein the second member includes a second nozzle adapted to be inserted into the other of the conduits.

* * * * *

UNITED STATES PATENT AND TRADEMARK OFFICE
CERTIFICATE OF CORRECTION

PATENT NO. : 7,044,506 B2
APPLICATION NO. : 10/635966
DATED : May 16, 2006
INVENTOR(S) : Wei Dong Zhao It is certified that error appears in the above-identified patent and that said Letters Patent is hereby corrected as shown below:

Title page should be deleted and substitute therefor the attached title page as shown on the attached pages.

In the drawings, Sheets 1-2, FIGS. 1-6 should be replaced with the attached Figures 1-6.

Signed and Sealed this
Nineteenth Day of November, 2013

Teresa Stanek Rea
*Deputy Director of the United States Patent and Trademark Office*

(12) United States Patent
Dong (10) Patent No.: US 7,044,506 B2
(45) Date of Patent: May 16, 2006

(54) QUICK CONNECTOR ASSEMBLY

(75) Inventor: Zhao Wei Dong, Xinglin (CN)

(73) Assignee: Xiamen Lota International Co., Ltd., Xiamen (CN)

(*) Notice: Subject to any disclaimer, the term of this patent is extended or adjusted under 35 U.S.C. 154(b) by 111 days.

(21) Appl. No.: 10/635,966

(22) Filed: Aug. 7, 2003

(65) Prior Publication Data
US 2005/0029810 A1 Feb. 10, 2005

(51) Int. Cl.
*F16L 39/00* (2006.01)

(52) U.S. Cl. .................. 285/319; 285/921; 285/81
(58) Field of Classification Search ........ 285/272, 285/278, 280, 82, 148.1, 148.5, 148.19, 148.21, 285/87, 313, 317, 308, 319, 921, 39, 233, 285/320, 148.14, 81
See application file for complete search history.

(56) References Cited
U.S. PATENT DOCUMENTS
5,324,081 A * 6/1994 Umezawa ............ 285/319
5,415,825 A * 5/1995 Sellers ............ 285/319
5,725,257 A * 3/1998 Sakane et al. ............ 285/81

* cited by examiner

*Primary Examiner*—Aaron Dunwoody
(74) *Attorney, Agent, or Firm*—Wallenstein Wagner & Rockey, Ltd.

(57) ABSTRACT

A connector assembly (10) for releasably connecting a pair of conduits (12, 14) is disclosed. The assembly (10) comprises a first member (20) and a second member (40). The first member (20) has a nozzle (22) and the first member (20) is adapted to be connected to one of the conduits (12). The first member (20) includes an anchor (60) rotatably mounted on the first member (20). The anchor (60) has at least one resilient tab (62) extending therefrom. The second member (40) has an opening (45) that receives the nozzle (22). The second member (40) has at least one aperture (46). The second member (40) is also adapted to be connected to the other of the conduits (14). The tab (62) engages the aperture (46) to releasably connect the first and second members (20, 40).

24 Claims, 2 Drawing Sheets